(12) United States Patent
Lee

(10) Patent No.: US 8,416,684 B2
(45) Date of Patent: Apr. 9, 2013

(54) TIME AND DATA RATE POLICING

(75) Inventor: Jay J. Lee, San Ramon, CA (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 302 days.

(21) Appl. No.: 12/967,834

(22) Filed: Dec. 14, 2010

(65) Prior Publication Data

US 2012/0147744 A1 Jun. 14, 2012

(51) Int. Cl.
*H04L 12/26* (2006.01)
(52) U.S. Cl. .................. 370/229; 370/235; 370/252
(58) Field of Classification Search .................. None
See application file for complete search history.

(56) References Cited

U.S. PATENT DOCUMENTS

| | | | |
|---|---|---|---|
| 6,560,195 B1 * | 5/2003 | Basak et al. | 370/230 |
| 2002/0071387 A1 * | 6/2002 | Horiguchi et al. | 370/229 |
| 2005/0122906 A1 * | 6/2005 | Yazaki et al. | 370/230.1 |
| 2005/0128946 A1 * | 6/2005 | Murakami et al. | 370/230 |
| 2006/0146710 A1 * | 7/2006 | Roy | 370/235 |

* cited by examiner

Primary Examiner — Steven H Nguyen

(57) ABSTRACT

A non-transitory computer-readable medium includes instructions for receiving a message associated with a session with a user device; determining that a quantity of tokens, to be used to process the message, is less than another quantity of tokens stored in a memory; determining that a session time is less than a threshold based on the determination that the quantity of tokens is less than the other quantity of tokens; determining that a violation has occurred when a time interval is greater than an interval threshold based on the determination that the session time is less than the threshold, where the time interval is from a prior time when another message, associated with the session, was received to a time that the message was received, and where the determining includes incrementing a quantity of violations associated with the session; outputting the message when the quantity of violations is not greater than a violation threshold; and dropping the message when the quantity of violations is greater than the violation threshold.

24 Claims, 6 Drawing Sheets

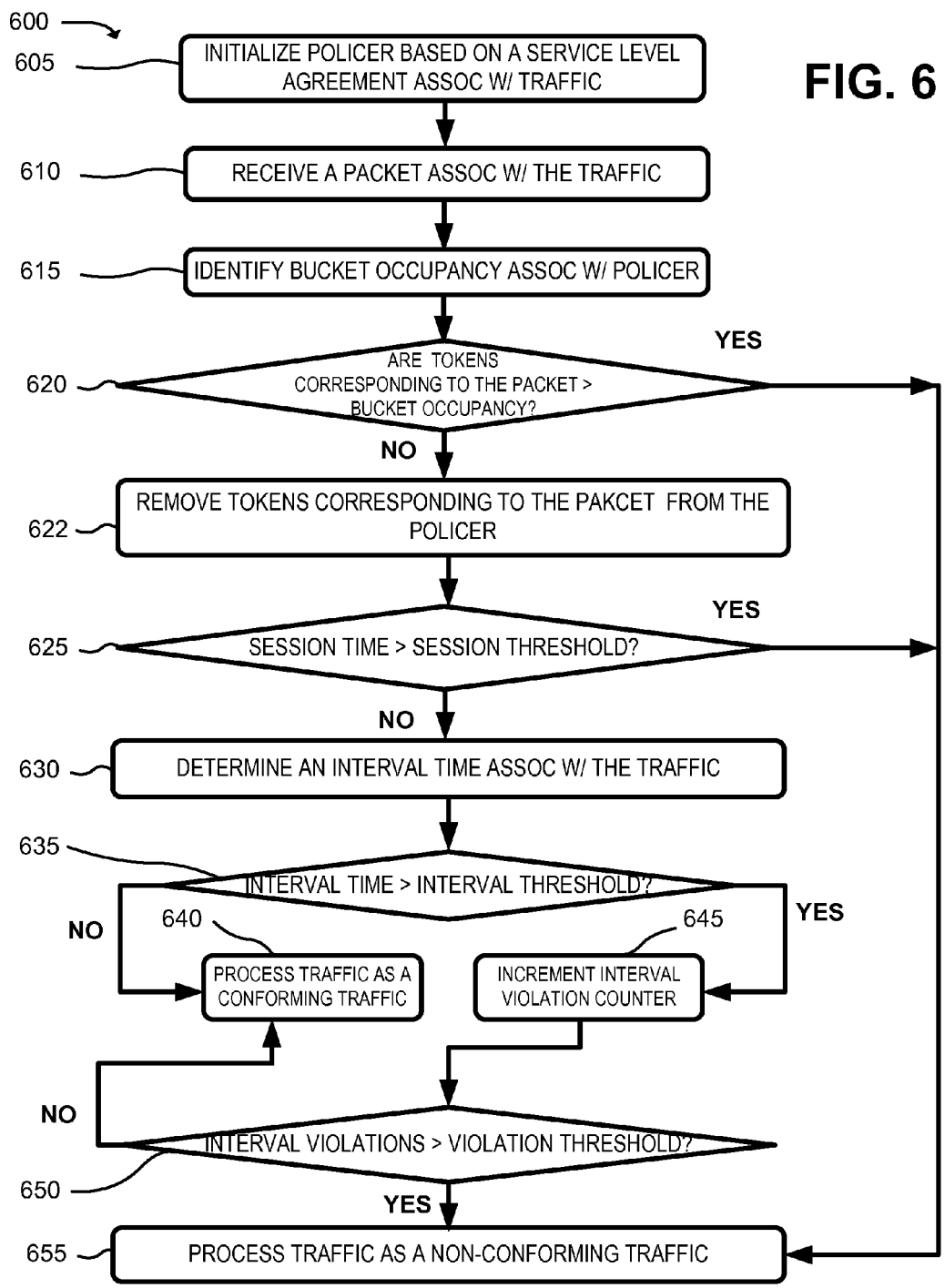

TIME AND DATA RATE POLICING

BACKGROUND

Evolved Packet System (EPS) is a network architecture associated with the third generation partnership project (3GPP) wireless communication standard. The EPS includes an evolved packet core (EPC) through which traffic, associated with a communication session with a user device, is transported to and/or received from a network (e.g., the Internet, a packet data network, etc.). The EPS also includes a long term evolution (LTE) network, which is a radio access network (RAN) via which the user device communicates with the EPC during the communication session.

The EPS is capable of processing various types of traffic (e.g., video, voice, text, etc.) at higher throughput and/or bandwidth than previous generation architectures (e.g., pre-3GPP networks). The various types of traffic are often associated with high bandwidth and/or data rates, which are often generated by high bandwidth applications (e.g., social networking, cloud computing, email, gaming, etc.). The high bandwidth traffic may be processed by the EPS in a manner that minimizes congestion as compared to networks based on previous generation architectures.

However, not all applications generate traffic associated with high bandwidth and/or data rates. Some low bandwidth applications (e.g., Instant Messaging (IM), Internet-based chat sessions, etc.) may generate low bandwidth traffic and/or be associated with long session times and/or long intervals of inactivity (e.g., a period of time between messages or packets). High data rate policers, used by the EPC to process the high bandwidth traffic, may not be well suited to process traffic associated with low bandwidth applications. Additionally, the long session times, low bandwidth traffic, and/or long intervals of inactivity, that are associated with sessions using low bandwidth applications, may utilize radio resources, associated with the LTE network, in a manner that is disproportionate relative to the quantity of traffic and/or data that is being processed by the LTE network and/or EPC.

BRIEF DESCRIPTION OF THE DRAWINGS

FIG. 6 is a flow chart of an example time and data rate policing process according to an implementation described herein.

DETAILED DESCRIPTION OF PREFERRED EMBODIMENTS

Figure 1:
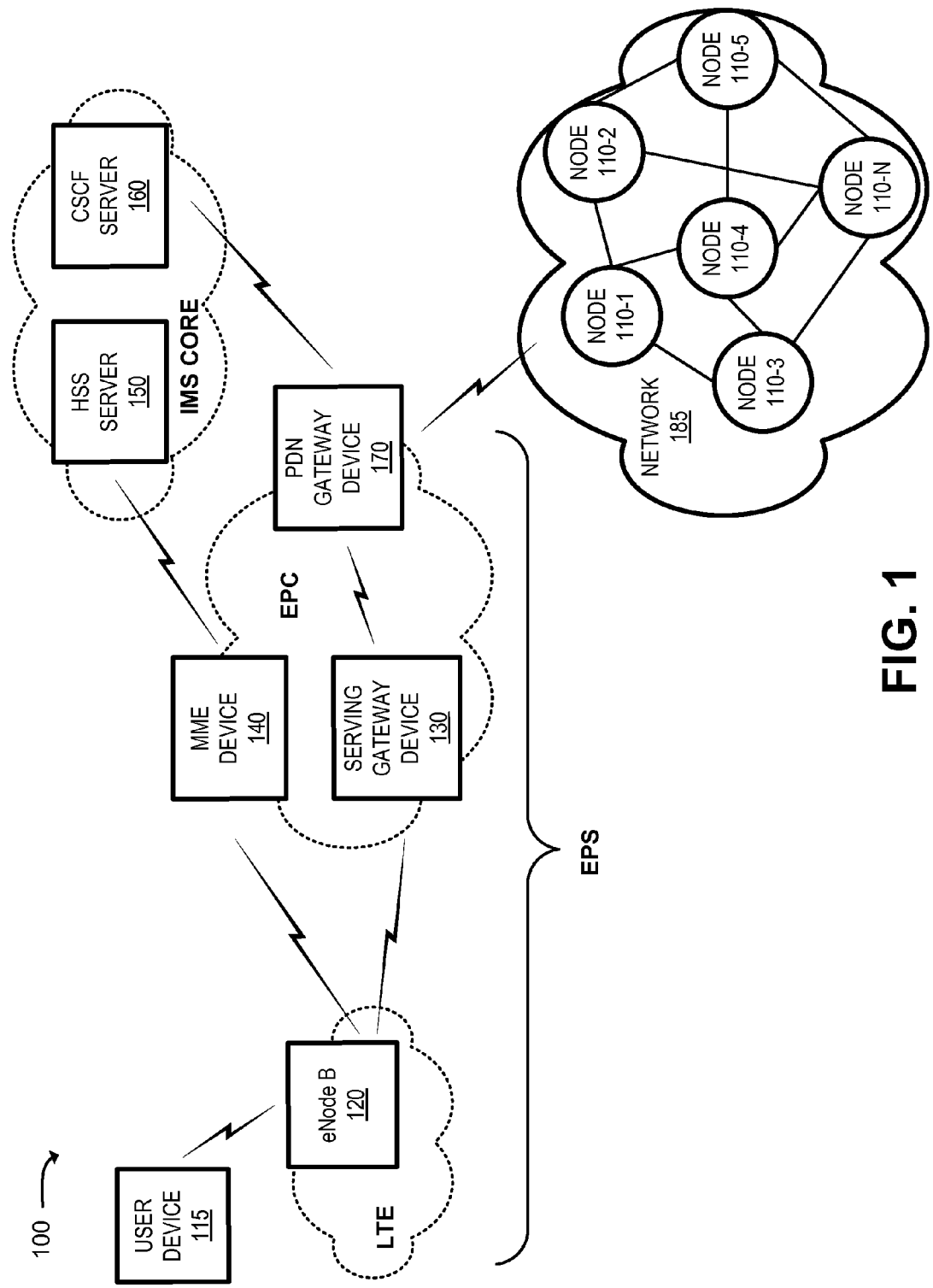
FIG. 1 is a diagram of an example environment in which systems and/or methods described herein may be implemented.

The following detailed description refers to the accompanying drawings. The same reference numbers in different drawings may identify the same or similar elements. Also, the following detailed description does not limit the embodiments.

Systems and/or methods, described herein, may enable high bandwidth traffic and low bandwidth traffic to be processed using a time and data rate-based policing technique (TDP). The TDP technique may be executed by a TDP policer associated with a network device and/or a node within a network.

The term "high bandwidth traffic," as used herein, may include traffic that is generated and/or received by a high-bandwidth application that corresponds to a bandwidth and/or data rate that is greater than a threshold. High-bandwidth traffic may be associated with frequent and/or short-duration (e.g., relative to a threshold) bursts of high data rate and/or bandwidth traffic. The term "low bandwidth traffic," as used herein, may include traffic that is generated and/or received by a low-bandwidth application that corresponds to a bandwidth and/or data rate that is not greater than the threshold. Low-bandwidth traffic may be associated with infrequent and/or short-duration bursts of low data rate and/or bandwidth traffic. Low-bandwidth traffic may also be associated with long periods of inactivity and/or long session times (e.g., five minutes, 30 minutes, one hour, six hours, etc.) that corresponds to, for example, an IM session throughout the course of a day, a work shift, etc. An example of a high bandwidth application may include a video stream. An example of a low bandwidth application may include an instant messaging (IM) application. Some applications, such as social networking based applications, email, cloud computing, or Internet-based gaming applications, may be either a high or low bandwidth application, depending on the particular application and usage pattern of the application.

The TDP policer may include components that process traffic using a data rate-based policing component and/or a time-base policing component. The data rate-based policing component may generally be used to police high bandwidth traffic. The time-based policing component may generally be used to police low bandwidth traffic. For example, the data-rate based policing component may generally be used to determine whether high bandwidth traffic, associated with a high bandwidth application, is conforming or non-conforming based on a data rate threshold specified in a service level agreement (SLA). The SLA may be associated with a user device that hosts the high bandwidth and/or low bandwidth application.

In another example, the time-based component may generally be used to determine whether low bandwidth traffic, associated with a low bandwidth application, is conforming or non-conforming based on a session threshold and/or an interval threshold specified in the SLA. The determination, by the time-based component, may be based on whether a session time (e.g., a time period associated with a communication session with a device on which the low-bandwidth application is hosted) is greater than the session threshold and/or whether a time interval (e.g., time interval between messages, packets, etc. associated with the session) is greater than the interval threshold.

If the TDP policer determines that the traffic is conforming (e.g., complies with bandwidth, session threshold, and/or interval threshold as specified by the SLA), then the TDP policer may process the traffic based on a priority associated with the traffic. If, however, the TDP policer determines that the traffic is non-conforming (e.g., does not comply with the bandwidth threshold, the session threshold, and/or the interval threshold as specified by the SLA), then the TDP policer may drop, delay, and/or reduce a forwarding priority for the packets associated with the traffic.

FIG. 1 is a diagram of an example environment 100 in which systems and/or methods described herein may be implemented. As shown in FIG. 1, environment 100 may include a group of network nodes 110-1, 110-2, ..., 110-N (where N≧1) (hereinafter referred to collectively as "nodes 110" and individually as "node 110"), a user device 115, an e-Node B 120 (hereinafter referred to as "eNB 120"), a serving gateway device 130 (hereinafter referred to as "SGW 130"), a mobility management entity device 140 (hereinafter referred to as "MME 140"), a home subscriber service server 150 (hereinafter referred to as an "HSS server 150"), a call session control function (CSCF) server 160 (hereinafter referred to as "CSCF server 160"), a packet data network (PDN) gateway device 170 (hereinafter referred to as a "PGW 170"), and a network 185. The number of devices, nodes, and/or networks, illustrated in FIG. 1, is provided for explanatory purposes only. In practice, there may be additional devices, nodes and/or networks; fewer devices, nodes, and/or networks; different devices, nodes and/or networks; or differently arranged devices, nodes and/or networks than illustrated in FIG. 1.

Also, in some implementations, one or more of the devices of environment 100 may perform one or more functions described as being performed by another one or more of the devices of environment 100. For example, MME 140, HSS server 150, and/or CSCF server 160 may be integrated into a single device. In another example, SGW 130 and/or PGW 170 may be integrated into a single device. Devices of environment 100 may interconnect via wired connections, wireless connections, or a combination of wired and wireless connections.

Environment 100 may include an evolved packet system (EPS) that includes a long term evolution (LTE) network and/or an evolved packet core (EPC) that operate based on a third generation partnership project (3GPP) wireless communication standard. The LTE may be a radio access network (RAN) that includes one or more eNBs 120 via which user device 115 communicates with the EPC. The EPC may include SGW 130, MME 140, and/or PGW 170 that enables user device 115 to communicate with network 185 and/or the Internet protocol (IP) multimedia subsystem (IMS) core. The IMS core may include HSS server 150 and/or CSCF server 160 and may manage authentication, session initiation, account information, profile information, etc. associated with user device 115.

Node 110 may include a network device that transmits data traffic. For example, node 110 may take the form of a routing device, a switching device, a multiplexing device, or a device that performs a combination of routing, switching, and/or multiplexing functions. In one implementation, node 110 may be a digital device. In another implementation, node 110 may be an optical device. In yet another implementation, node 110 may be a combination of a digital device and an optical device.

Node 110 may include an internal or external storage device and/or memory that stores information associated with node 110 operations. In one example, node 110 may store, in the storage device and/or memory, network topology information, routing tables and/or packet forwarding tables. Node 110 may act as an edge device and may generally function to connect network 185 to the EPS and/or another network. In another example, node 110 may act as a core device and may function to transmit traffic between other nodes 110 within network 185. Node 110 may add (push) and/or remove (pop) information (e.g., headers, trailers, tags, etc.) from incoming and/or outgoing packets. In another implementation, nodes 110 may process traffic in a manner that enforce a QoS policy associated with network 185 and/or a SLA associated with another network or user device 115.

Node 110 may receive traffic and may process the traffic based on an SLA associated with user device 115 from which the traffic was received. For example, the processing may include policing the traffic using a TDP technique. The traffic may, for example, be policed based on a data rate and/or bandwidth associated with the traffic to determine whether the traffic conforms to a data rate threshold specified in the SLA. In another example, the processing may include policing the traffic based on a period of time during which a session, associated with user device 115, is conducted (e.g., a session duration) and/or an interval of time between messages associated with the session (e.g., a message interval). Node 110 may use the session duration and/or message interval to determine whether the traffic conforms to a session threshold and/or an interval threshold, respectively, specified in the SLA.

Node 110 may determine that the traffic conforms to the SLA and may process and/or forward the traffic with a particular forwarding priority identified by the SLA and/or a QoS policy. If, however, node 110 determines that the traffic does not conform to the SLA, then node 110 may drop packets associated with the traffic. In another example, node 110 may delay the traffic and/or may process and/or forward the traffic with a lower priority identified in the SLA and/or QoS policy.

User device 115 may include any computation or communication device, such as a wireless mobile communication device that is capable of communicating with eNB 120. For example, user device 115 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a camera, a personal gaming system, or another type of mobile computation or communication device.

eNB 120 may include one or more devices that receive, process, and/or transmit traffic, such as voice, video, text, and/or other data, destined for and/or received from user device 115. One or more eNBs 120 may be associated with the LTE network that receives traffic from and/or sends traffic to network 185 and/or the IMS core via the EPC. eNB 120 may send traffic to and/or receive traffic from user device 115 via an air interface (via an LTE-Uu interface).

SGW 130 may include one or more devices, or other types of computation or communication devices, that gather, process, search, store, and/or provide information in a manner similar to that described herein. SGW 130 may, for example, aggregate traffic received from one or more eNBs 120 and may send the aggregated traffic to network 185 (e.g., via PGW 170) and/or other devices associated with the IMS core and/or the EPC. SGW 130 may also receive traffic from the other network devices and/or may send the received traffic to user device 115 via eNB 120. For example, SGW 130 may receive an instruction (e.g., as a result of a registration operation, handoff operation, and/or some other operation) from MME 140 to establish a connection (e.g., a tunnel) that permits user device 115 to communicate with other network devices associated with the EPC, the IMS core, and/or network 185.

SGW 130 may receive traffic associated with user device 115 and may process the traffic based on an SLA associated with user device 115. For example, the processing may include policing the traffic using a TDP technique. The traffic may, for example, be policed based on a data rate and/or bandwidth associated with the traffic to determine whether the traffic conforms to a data rate threshold specified in the SLA. In another example, the processing may include policing the traffic based on a period of time during which a session, associated with user device 115, is conducted (e.g., a session duration) and/or an interval of time between messages associated with the session (e.g., a message interval). SGW 130 may use the session duration and/or message interval to determine whether the traffic conforms to a session threshold and/or an interval threshold, respectively, specified in the SLA.

SGW 130 may determine that the traffic conforms to the SLA and may process and/or forward the traffic with a particular forwarding priority identified by the SLA and/or a QoS policy. If, however, SGW 130 determines that the traffic does not conform to the SLA, then SGW 130 may drop packets associated with the traffic. In another example, SGW 130 may delay the traffic and/or may process and/or forward the traffic with a lower priority identified in the SLA and/or QoS policy.

MME 140 may include one or more devices, or other types of computation or communication devices, that gather, process, search, store, and/or provide information in a manner similar to that described herein. For example, MME 140 may perform operations associated with a handoff to and/or from the EPS. MME 140 may perform operations to register user device 115 with the EPS, to handoff user device 115 from the EPS to another network, to handoff a user device 115 from the other network to the EPS, and/or to perform other operations. MME 140 may perform policing operations on traffic destined for and/or received from user device 115 based on the TDP techniques described above (e.g., with respect to node 110 and/or SGW 130).

HSS server 150 may include one or more server devices, or other types of computation or communication devices, that gather, process, search, store, and/or provide information in a manner similar to that described herein. For example, HSS server 150 may manage, update, and/or store, in a memory associated with HSS server 150, service profile information associated with user device 115 that includes access point names (APNs) that are permitted for and/or accessible by user device 115, information associated with a user of user device 115 (e.g., a username, a password, a personal identification number (PIN), etc.), rate information, minutes allowed, and/or other information. APNs identify particular applications services, and/or data that are permitted for user device 115 in the EPS. Additionally, or alternatively, a particular APN may correspond to a packet data network (PDN) or a set of PDNs (e.g., the Internet, an intranet, etc.) that permit access to other applications, services, and/or data. Additionally, or alternatively, HSS server 150 may include a device that performs authentication, authorization, and/or accounting (AAA) operations associated with a communication session with user device 115.

CSCF server 160 may include one or more server devices, or other types of computation or communication devices, that gather, process, search, store, and/or provide information in a manner similar to that described herein. In one example implementation, CSCF server 160 may execute session initiation protocols (SIPs) associated with establishing a session with user device 115.

PGW 170 may include one or more devices, or other types of computation or communication devices, that gather, process, search, store, and/or provide information in a manner similar to that described herein. In one example, implementation, PGW 170 may include a device that aggregates traffic received from one or more SGWs 130 and may send the aggregated traffic to network 185 and/or the IMS core (e.g., CSCF server 160). In another example implementation, PGW 170 may receive traffic from network 185 and may send the traffic toward user device 115 via SGW 130 and/or eNB 120. PGW 170 may perform policing operations on traffic destined for the EPS and/or received from the EPS based on the TDP techniques described above (e.g., with respect to node 110, SGW 130, etc.).

Network 185 may include one or more wired and/or wireless networks. For example, network 185 may include a cellular network, a public land mobile network (PLMN), a second generation (2G) network, a third generation (3G) network, a fourth generation (4G) network, a fifth generation (5G) network, and/or another network. Additionally, or alternatively, network 185 may include a wide area network (WAN), a metropolitan network (MAN), an ad hoc network, an intranet, the Internet, a fiber optic-based network (e.g., a FiOS network), and/or a combination of these or other types of networks. Network 185 may include nodes 110 via which traffic is transported to and/or from the EPS (e.g., via PGW 170) and/or another network.

Figure 2:
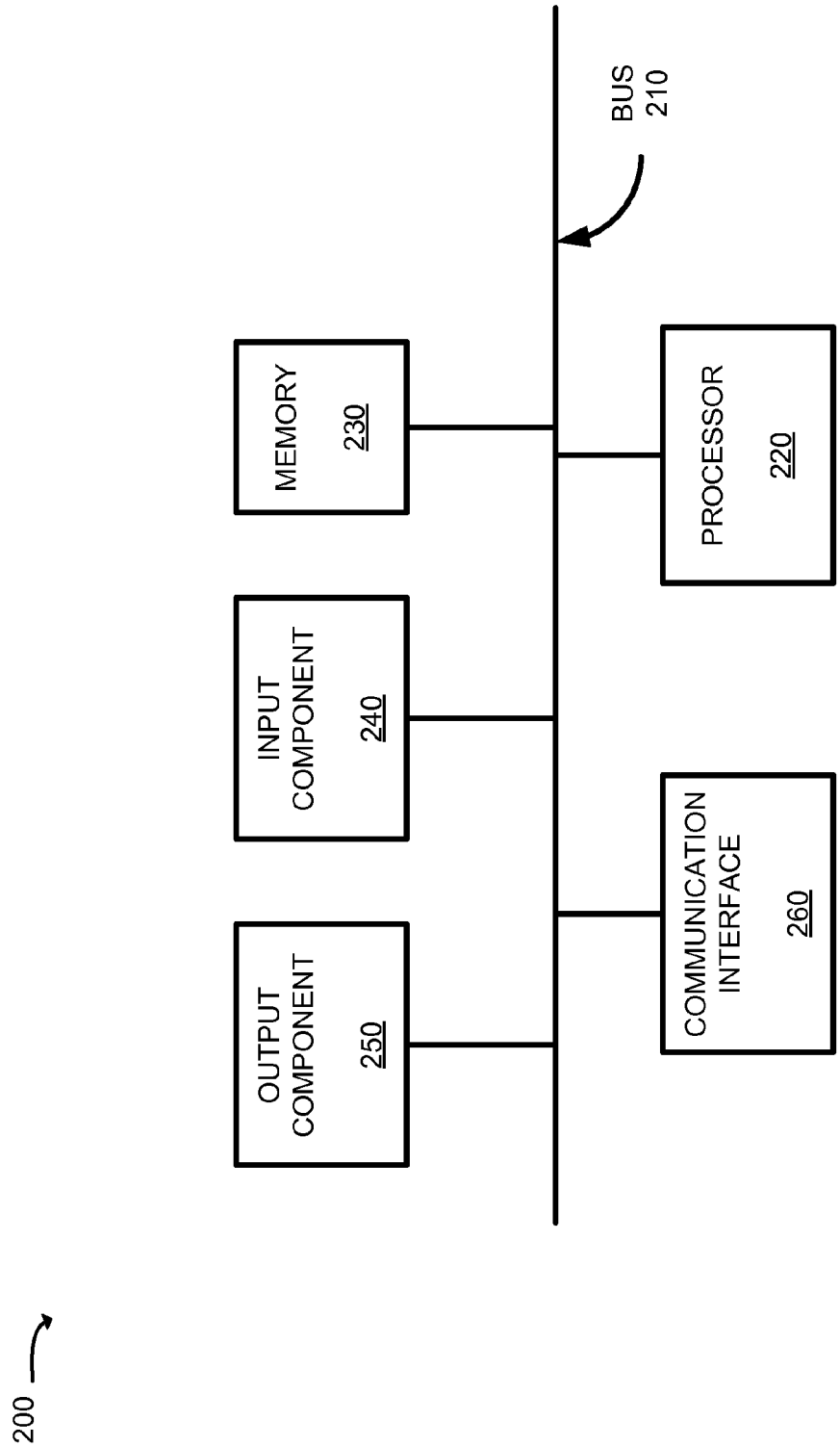
FIG. 2 is a diagram of example components of one or more of the devices of FIG. 1.

FIG. 2 is a diagram of example components of a device 200. Device 200 may correspond to user device 115, SGW 130, MME 140, HSS server 150, CSCF server 160, and/or PGW 170. Alternatively, or additionally, each of user device 115, SGW 130, MME 140, HSS server 150, CSCF server 160, and/or PGW 170 may include one or more devices 200.

Device 200 may include a bus 210, a processor 220, a memory 230, an input component 240, an output component 250, and a communication interface 260. Although FIG. 2 shows example components of device 200, in other implementations, device 200 may contain fewer components, additional components, different components, or differently arranged components than depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as network 185. In one alternative implementation, communication interface 260 may be a logical component that includes input and output ports, input and output systems, and/or other input and output components that facilitate the transmission of data to other devices.

As will be described in detail below, device 200 may perform certain operations relating to traffic policing using a TDP technique. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
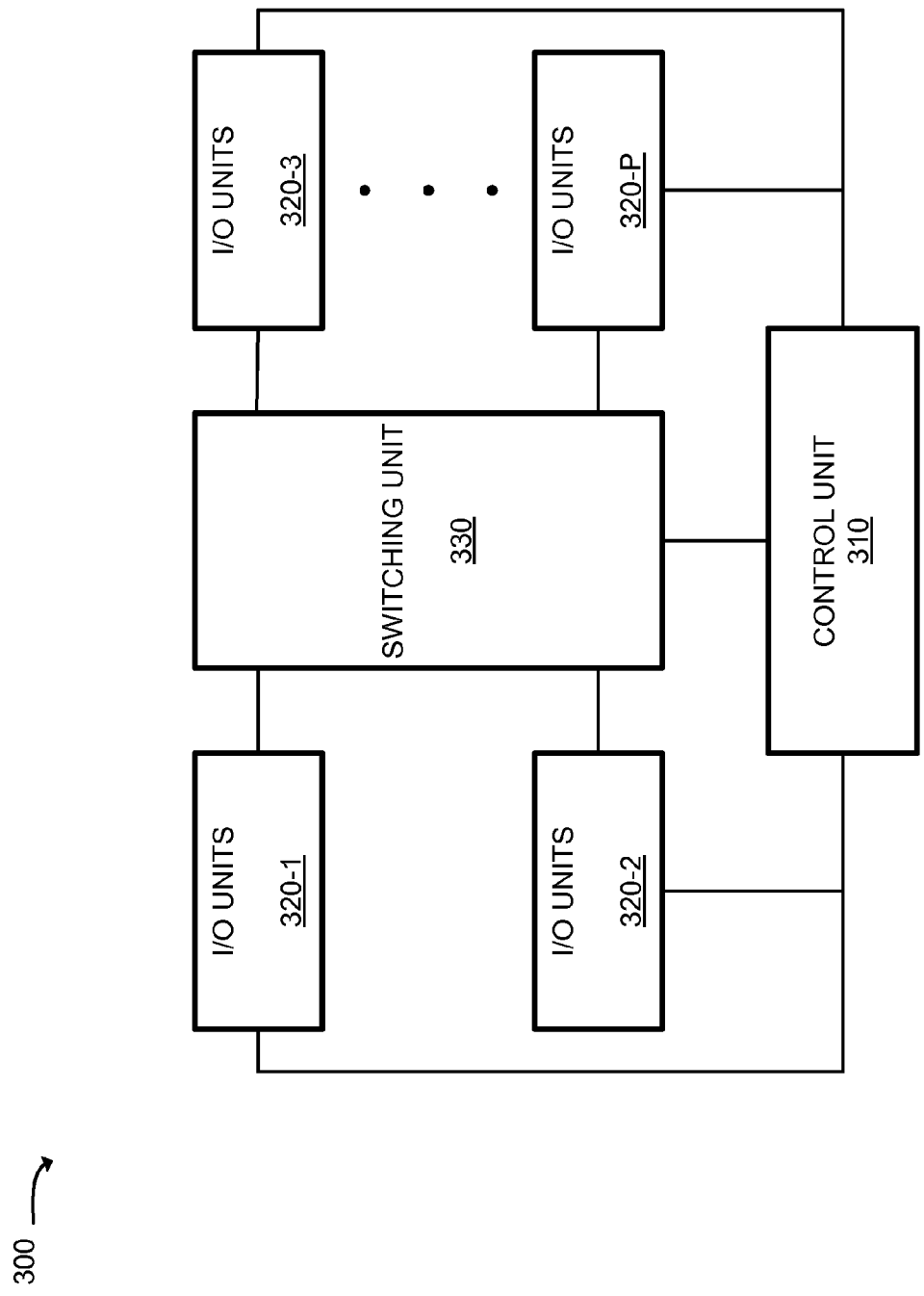
FIG. 3 is a diagram of example components of one or more of the nodes of FIG. 1.

FIG. 3 is a diagram of example components of node 300 that may correspond to node 110. Alternatively, or additionally, node 110 may include one or more nodes 300. In another example implementation, SGW 130, MME 140, HSS server 150, CSCF server 160, and/or PGW 170, which were identified as being associated with device 200 of FIG. 2, may correspond to node 300. SGW 130, MME 140, HSS server 150, CSCF server 160, and/or PGW 170 may, in the other implementation, include one or more nodes 300. Node 300 may take the form of a router, although the systems and/or methods herein may be implemented in another type of network device. For example, node 300 may include another data transfer device, such as a gateway, a switch, a firewall, a network interface card (NIC), a hub, a bridge, a proxy server, an optical add-drop multiplexer (OADM), or some other type of device that processes and/or transfers traffic.

Node 300 may receive network traffic, as one or more packet stream(s), from physical links, may process the packet stream(s) to determine destination information, and may transmit the packet stream(s) out on links in accordance with the destination information. Node 300 may include a control unit 310, a set of input/output (I/O) units 320-1, ..., 320-P (where P≧1) (hereinafter referred to collectively as "I/O units 320" and individually as "I/O unit 320"), and a switching unit 330.

Control unit 310 may include a processor, a microprocessor, or some form of hardware logic (e.g., an application specific integrated circuit (ASIC) or a field programmable gate array (FPGA)). In one example implementation, control unit 310 may include an Ethernet controller and/or another controller device. Control unit 310 may perform high level management functions for node 300. For example, control unit 310 may maintain the connectivity and manage information/data necessary for transferring packets by node 300. Control unit 310 may create routing tables based on network topology information, create forwarding tables based on the routing tables, and communicate the forwarding tables to I/O units 320. I/O units 320 may use the forwarding tables to perform route lookup for incoming packets and perform the forwarding functions for node 300. Control unit 310 may also perform other general control and monitoring functions for node 300.

I/O unit 320 may include a component or collection of components to receive incoming packets, to process incoming and/or outgoing packets, and/or to transmit outgoing packets. For example, I/O unit 320 may include I/O ports, a packet forwarding component (PFC), an Ethernet interface and/or another type of interface, a central processing unit (CPU), and/or a memory device. I/O unit 320 may include a collection of ports that receive or transmit packets via physical links. I/O unit 320 may also include packet processing component(s), switch interface component(s), Internet processor component(s), memory device(s), etc.

Each of I/O units 320 may be connected to control unit 310 and switching unit 330. I/O units 320 may receive packet data on physical links connected to a network (e.g., network 100). Each physical link could be one of many types of transport media, such as an optical fiber or an Ethernet cable.

I/O units 320 may process incoming packet data prior to transmitting the data to another I/O unit 320 or the network. I/O units 320 may perform route lookups for the data using the forwarding table from control unit 310 to determine destination information. If the destination indicates that the data should be sent out on a physical link, connected to I/O unit 320, then I/O unit 320 may prepare the data for transmission by, for example, adding any necessary headers and/or modifying existing headers, and/or transmitting the data from the port associated with the physical link. If the destination indicates that the data should be sent to another I/O unit 320 via switching unit 330, then I/O unit 320 may, if necessary, prepare the data for transmission to the other I/O unit 320 and/or may send the data to the other I/O unit 320 via switching unit 330.

As will be described in detail below, device 300 may perform certain operations relating to traffic policing using a TDP technique. Device 300 may perform these operations in response to control unit 310 and/or one or more I/O units 320 executing software instructions contained in a computer-readable medium, such as a memory associated with control unit 310 and/or the one or more I/O units 320, respectively. A computer-readable medium may be defined as a non-transitory memory device. A memory device may include space within a single physical memory device or spread across multiple physical memory devices. The software instructions may be read into the memory from another computer-readable medium or from another device. The software instructions contained in the memory may cause control unit 310 and/or the one or more I/O units 320 to perform processes described herein. Alternatively, hardwired circuitry may be used in place of or in combination with software instructions to implement processes described herein. Thus, implementations described herein are not limited to any specific combination of hardware circuitry and software.

Switching unit 330 may include one or multiple switching planes to facilitate communication among I/O units 320 and/or control unit 310. In one implementation, each of the switching planes may include a single-stage switch or a multi-stage switch of crossbar elements. Switching unit 330 may also, or alternatively, include processors, memories, and/or paths that permit communication among I/O units 320 and/or control unit 310.

Although, FIG. 3 illustrates example components of node 300, in other implementations, node 300 may include additional components, fewer components, different components, or differently arranged components than those illustrated in FIG. 3 and described herein. Additionally, or alternatively, one or more operations described as being performed by a particular component of node 300 may be performed by one or more other components, in addition to or instead of the particular component of node 300.

Figure 4:
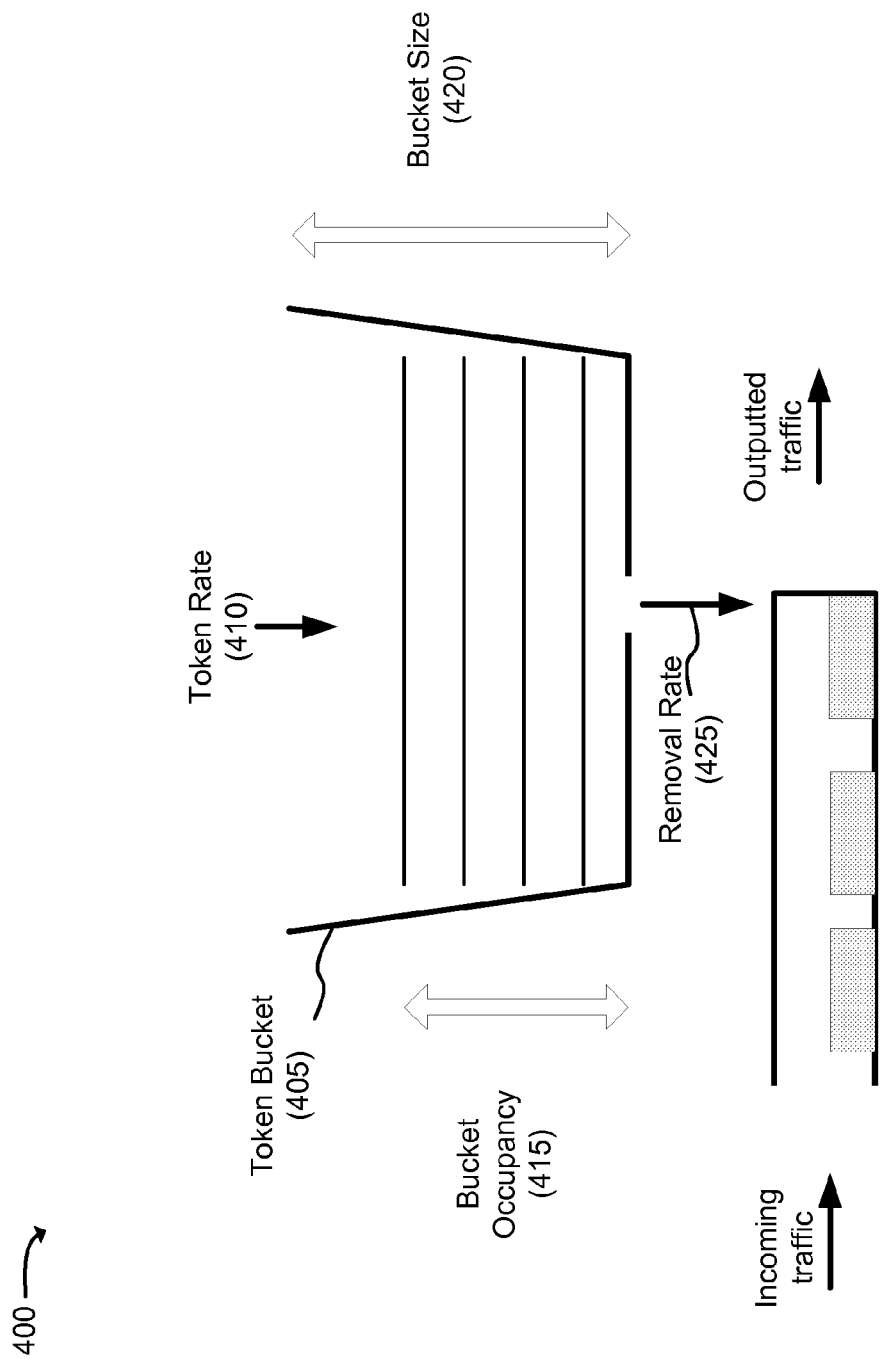
FIG. 4 is a diagram of an example data rate policer according to an implementation described herein.

FIG. 4 is a diagram of an example data rate policer 400 associated with one or more devices and/or nodes of FIG. 1. One or more data rate policers 400 may be implemented, as software and/or hardware, within one or more components of SGW 130, MME 140, and/or PGW 170 (e.g., as illustrated in FIG. 2) and/or within one or more components of node 110 (e.g., as illustrated in FIG. 3). Data rate policer 400 may perform operations to police traffic, enforce a QoS policy, and/or enforce terms of a SLA and/or traffic contract. Data rate policer 400 may include a token bucket 405. Token bucket 405 may be associated with a token rate 410, a bucket occupancy 415, a bucket size 420, and a removal rate 425.

Token bucket 405 may temporarily store tokens associated with particular traffic, such as traffic for a particular application, being received from and/or sent to user device 115. For example, token bucket 405 may temporarily store tokens associated with traffic being sent and/or received by an email application hosted by user device 115. In another example, another token bucket 405 may temporarily store tokens associated with traffic being sent and/or received by an IM application hosted by user device 115. Token rate 410 may be a rate at which tokens are added to and/or stored in token bucket 405. For example, token bucket 405 may store a quantity of tokens per unit of time based on token rate 410. Token rate 410 may be identified in an SLA associated with user device 115, which may correspond to an expected data rate and/or bandwidth (e.g., an average bandwidth and/or data rate over a period of time) associate with the particular traffic. For example, if the particular traffic flow is high bandwidth traffic, then token rate 410 may be specified, by the SLA, based on an expected high data rate (e.g., greater than a threshold) associated with the high bandwidth traffic. If, however, the particular traffic is low bandwidth traffic, then token rate 410 may be specified based on an expected low data rate (e.g., less than a low threshold) associated with the low bandwidth traffic.

Bucket occupancy 415 may be an instantaneous quantity of tokens that are stored in token bucket 405 at a particular point in time. For example, tokens may accumulate within token bucket 405 over a period of time (e.g., based on token rate 410). Bucket occupancy 415 may represent the quantity of tokens stored in token bucket 405 at a particular point in time. Bucket size 420 may be a maximum quantity of tokens (e.g., a capacity of token bucket 405) that can be stored in token bucket 405. For example, the tokens may accumulate within token bucket 405 until a quantity of tokens reaches a maximum token threshold. At this time, token bucket 405 may not store additional tokens. Bucket occupancy 415 (e.g., "BO") may not exceed bucket size 420 and/or may not be less than zero (e.g., $0 \leq BO \leq BS$, where BS is the maximum quantity of tokens that can be stored in token bucket 405).

Removal rate 425 may be a rate at which tokens are removed from token bucket 405. Removal rate 425 may fluctuate depending on a data rate at which the particular traffic is being received and/or processed by data rate policer 400. For example, a packet associated with the particular traffic may be received and one or more tokens may be removed from token bucket 405 based on, for example, a size of the packet. For example, if a token corresponds to an octet of data (e.g., 8 bits of data), and a packet of eight octets (e.g., 64 bits) is being processed, then eight tokens may be removed from token bucket 405. Thus, as the data rate increases (e.g., when packet size increases and/or when a quantity of packets received and/or processed increases), the quantity of tokens removed from token bucket 405 may increase. Alternatively, or additionally, as the data rate decreases (e.g., when packet size decreases and/or when a quantity of packets received and/or processed decreases), the quantity of tokens removed from token bucket 405 may decrease.

Data rate policer 400 may police traffic received from and/or destined for user device 115. For example, token bucket 405 may store tokens based on token rate 410 (e.g., "TR"), which may be specified (e.g., by an SLA) based on an expected data rate associated with particular traffic (e.g., an average data rate over a period of time). In one example, if the data rate of the received traffic is less than the expected data rate, then token rate 410 may be greater than removal rate 425 (e.g., "RR"). When token rate 410 is greater than removal rate 425, bucket occupancy 415 may increase (e.g., when TR>RR) up to a maximum quantity of tokens that corresponds to bucket size 420 (e.g., $0 \leq BO \leq BS$). In this example, token bucket 405 will store a quantity of tokens that data rate policer 400 can use to process the traffic and/or output traffic as conforming traffic (e.g., the data rate associated with the traffic conforms to the data rate specified by the SLA).

In another example, if the data rate of the received traffic is greater than the expected data rate, then token rate 410 may be less than removal rate 425. When token rate 410 is less than removal rate 425, then bucket occupancy 415 may decrease (e.g., when TR<RR) for a period of time until token bucket 405 is empty. In other words, a burst of received traffic (e.g., associated with a data rate that is greater than the expected data rate) will be processed by data rate policer 400 for a period of time during which token bucket 405 stores tokens. If, however, the burst lasts for a period of time after which token bucket 405 has run out of tokens (e.g., when bucket occupancy 415 is zero), then the received traffic may be processed and/or outputted as non-conforming traffic (e.g., traffic that does not conform to the data rate specified by the SLA). When processing non-conforming traffic, data rate policer 400 may drop packets associated with the traffic, may down grade the forwarding priority of the traffic, may delay the traffic, etc.

Figure 5:
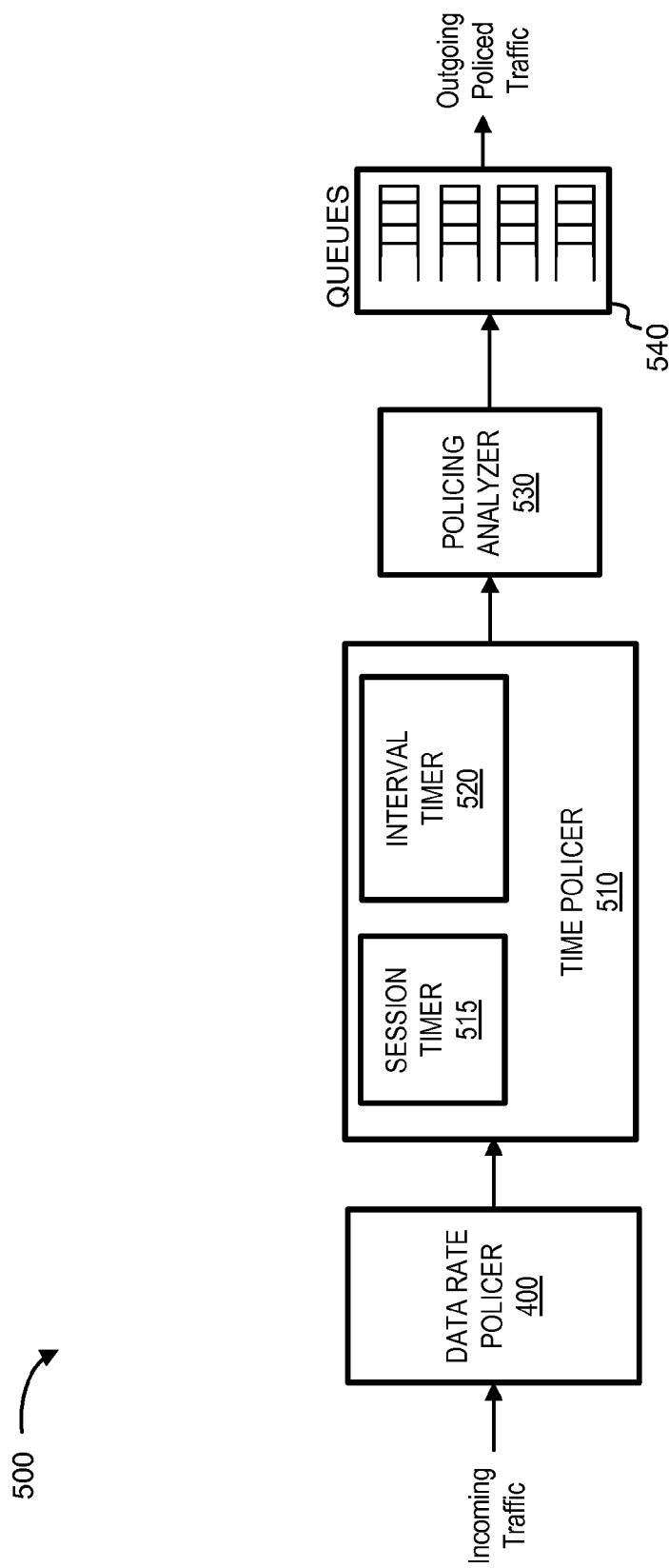
FIG. 5 is a diagram of example function components of a time and data rate policer associated with one or more devices and/or nodes of FIG. 1.

FIG. 5 is a diagram of example functional components of a time and data rate policer 500 (hereinafter referred to as "TDP policer 500") associated with one or more devices and/or nodes of FIG. 1. Functional components of one or more TDP policers 500 may be implemented, as software and/or hardware, within one or more components of node 110 (e.g., as illustrated in FIG. 3), and/or SGW 130, MME 140, and/or PGW 170 (e.g., as illustrated in FIGS. 2 and/or 3). TDP policer 500 may perform operations to police traffic, enforce a QoS policy, and/or enforce terms of a SLA and/or traffic contract. TDP policer 500 may include a data rate policer 400 (FIG. 4), a time policer 510, a policing analyzer 530, and queues 540.

Time policer 510 may include one or more functional components to police traffic based on time characteristics associated with traffic being processed by TDP policer 500. Time policer 510 may include a session timer 515 and an interval timer 520.

Session timer 515 may monitor and/or measure a session time associated with particular traffic being received from and/or sent to user device 115. Session timer 515 may use information associated with the session time to determine a manner in which to process traffic associated with the particular traffic. For example, session timer 515 may receive a first packet (and/or an indication that a first packet has been received) associated with the particular traffic and may initiate a communication session associated with the particular traffic (e.g., by marking a time that the first packet was received, by starting a session timer, etc.).

Session timer 515 may monitor an elapsed time associated with the communication session. For example, session timer 515 may receive another packet (and/or another indication that the other packet was received) associated with the particular traffic at a later point in time and may determine whether the session time is greater than a session threshold. The session threshold may correspond to a session threshold that is specified in an SLA associated with user device 115. The session time may be determined based on the timer and/or by determining an elapsed time from the time that the first packet was received to the later point in time that the other packet was received.

Session timer 515 may use the session time to determine the manner in which the particular traffic is to be processed relative to terms of the SLA. For example, session timer 515 may determine that the session time is less than the session threshold and may process the traffic as conforming traffic (e.g., a session time that conforms to the session threshold specified in the SLA). In other example, session timer 515 may determine that the session time is not less than the session threshold and may process the traffic as non-conforming traffic. When processing non-conforming traffic, session timer 515 may drop one or more packets associated with the particular traffic, may down grade the forwarding priority of the traffic, may delay the traffic, etc. based on terms, associated with non-conforming traffic, specified in the SLA. In another example implementation, session timer 515 may send the session time to policing analyzer 530 that enables policing analyzer to determine whether the session time is greater than the session threshold and/or to determine that manner in which to process conforming and/or non-conforming traffic.

Interval timer 520 may monitor and/or measure a time interval between packets (e.g., a packet interval timer) and/or messages (e.g., a message interval time) associated with particular traffic being received from and/or sent to user device 115. Interval timer 520 may send information associated with the time interval to policing analyzer 530 for processing to determine a manner in which to process the particular traffic. For example, interval timer 520 may receive a packet and/or group of packets (and/or an indication that the packet or group of packets was received) associated with the particular traffic and may identify a beginning of an interval associated with the particular traffic (e.g., by marking a time that the packet and/or group of packets was received, by starting an interval timer, etc.). In one example, the packet and/or group of packets may correspond to a message within an IM session (e.g., "Hi. How are you? It's been a long time . . . . ").

Interval timer 520 may monitor an elapsed time associated with an interval between packets and/or messages. For example, interval timer 520 may receive another packet and/or group of other packets (and/or an indication that the other packet or group of other packets was received) associated with the particular traffic at a later point in time. Interval timer 520 may determine an interval time associated with the packet and/or group of packets and the other packet and/or group of other packets. The other packet and/or group of other packets may correspond to a reply message within the IM session (e.g., "Great to hear from you! I'm doing just fine. How are you?").

Interval timer 520 may determine the interval time between the messages based on the interval timer and/or by determining an elapsed time from the time that the packet and/or group of packets was received to the later point in time that the other packet and/or group of other packets was received. Interval timer 520 may send information associated with the interval time to policing analyzer 530 to be processed.

Policing analyzer 530 may determine whether an interval violation has occurred and may process the traffic based on information associated with the interval violation. For example, policing analyzer 530 may receive the information associated with the interval time. Policing analyzer may identify whether an interval violation has occurred by determining whether the interval time is greater than an interval threshold. The interval threshold may correspond to an interval threshold that is specified in an SLA associated with user device 115. For example, policing analyzer 530 may determine that the interval time is less than the interval threshold and may process the traffic as conforming traffic (e.g., an interval time that conforms to the interval threshold specified in the SLA).

In another example, policing analyzer 530 may determine that the interval time is not less than the interval threshold and may increment a counter associated with a quantity of interval violations associated with the particular traffic (e.g., IV=IV+1, where IV is the quantity of interval violations).

Policing analyzer 530 may process the particular traffic based on the quantity of interval violations associated with the particular traffic. For example, policing analyzer 530 may determine that the quantity of interval violations is less than a quantity of interval violations threshold (e.g., IV≦M_IV, where M_IV is the quantity of interval violations threshold) specified in the SLA. Based on the determination that the quantity of interval violations is less than the quantity of interval violations threshold, policing analyzer 530 may process the traffic as conforming traffic. In another example, policing analyzer 530 may determine that the quantity of interval violations is not less than the quantity of interval violations threshold (e.g., IV>M_IV) specified in the SLA and may process the particular traffic as non-conforming traffic.

Queues 540 manage the assignment of packets to various ones of queues within Queues 540. Packets may be placed in queues 540 based on, for example, whether the packets are conforming or non-conforming. Queues 540 may determine the bandwidth allotted to each one of queues within queues 540.

Queues 540 may include, for example, a number of first-in-first-out (FIFO) queues that buffer packets before being output. Each queue, in queues 540, may be used to buffer the packets based on a priority associated with the packet. Different queues 540 may be allotted different transmission bandwidths. In this manner, conforming packets (e.g., associated with a particular priority) may be treated with a different (e.g., higher) priority relative to non-conforming packets.

FIG. 6 is a flow chart of an example TDP process 600. In one example implementation, process 600 may be performed by node 110, SGW 130, MME 140, and/or PGW 170. In another example implementation, some or all of process 600 may be performed by a device or collection of devices separate from, or in combination with, node 110, SGW 130, MME 140, and/or PGW 170.

As shown in FIG. 6, process 600 may include initializing TDP policer 500 based on a SLA associated with traffic (block 605). For example, TDP policer 500 may receive, from a network administrator, information and/or terms identified in a SLA associated with traffic to be received from and/or sent to user device 115. For example, TDP policer 500 may, in response to receiving the terms and/or information, initialize policing parameters, such as a session time (e.g., ST), an interval time (e.g., IT), and/or quantity of interval violations (e.g., IV) to an initial setting (e.g., ST=0, IT=0, and/or IV=0). Alternatively, or additionally, TDP policer 500 may set other policing parameters to an initial setting that corresponds to the information and/or terms identified in the SLA. For example, an SLA may specify a maximum time of inactivity that is permitted between messages and/or packets associated with particular traffic. Based on the maximum time of inactivity, TDP policer 500 may set an interval threshold that corresponds to the maximum time of inactivity (e.g., M_IT). In another example, the SLA may specify an expected bandwidth and/or data rate associated with the particular traffic. Based on the expected bandwidth and/or data rate, TDP policer 500 may set a token rate (e.g., token rate 410 of FIG. 4) that corresponds to the expected bandwidth and/or data rate associated with the particular traffic. In yet another example, the SLA may specify a maximum session time (e.g., M_ST) that is permitted with respect to the particular traffic. Based on the maximum session time, TDP policer 500 may set a session threshold that corresponds to the maximum session time. In still another example, the SLA may specify a maximum quantity of interval violations (e.g., M_IV) that is permitted with respect to the particular traffic. Based on the maximum session time, TDP policer 500 may set a session threshold that corresponds to the maximum session time.

As a result of initializing the policing parameters, TDP policer 500 may begin generating and/or storing tokens (e.g., at token rate 410 of FIG. 4) within TDP policer 500. TDP policer 500 may generate tokens up to a maximum quantity of tokens that corresponds to a maximum capacity of data rate policer 400 (e.g., bucket size 420 of FIG. 4).

As also shown in FIG. 6, process 600 may include receiving a packet associated with traffic (block 610) and identifying a bucket occupancy associated with TDP policer 500 (block 615). For example, TDP policer 500 may receive a packet and/or group of packets associated with traffic received from or sent to user device. TDP policer 500 may, as a result of receiving the packet and/or group of packets, determine a quantity of tokens stored in data rate policer 400 (e.g., based on bucket occupancy 415 of FIG. 4). Additionally, or alternatively, TDP policer 500 may determine a length of the packet and/or group of packets (e.g., by identifying a quantity of bits associated with the packet and/or group of packets). Based on the length of the packet and/or group of packets, TDP policer 500 may determine a packet size associated with the packet or group of packets relative to a quantity of bits to which a token corresponds. For example, if a token corresponds to an octet of data (e.g., 8 bits), then the packet or group of packets associated with a packet length of 96 bits corresponds to a packet size of 12 octets. In other words, a packet or group of packets that include 96 bits of data may correspond to 12 tokens when each token corresponds to an octet of data.

Alternatively, or additionally, TDP policer 500 may, mark a time and/or start a timer that corresponds to a time that the packet and/or group of packets were received. TDP policer 500 may monitor an elapsed time, from the time that the packet or group of packets were received to a current time to determine a session time associated with the traffic and/or an interval time between packets and/or messages associated with the traffic.

As further shown in FIG. 6, if the tokens corresponding the packet are greater than the bucket occupancy (block 620—YES), then process 600 includes processing traffic as non-conforming traffic (block 655). For example, TDP policer 500 may compare the packet size, associated with the packet and/or group of packets to the quantity of tokens stored in TDP policer 500. TDP policer 500 may determine, for example, that the packet size is greater than the quantity of packets stored in TDP policer 500 and may process the packet and/or group of packets as non-conforming traffic.

When processing the non-conforming traffic, TDP policer 500 may, for example, drop the packet and/or all or a portion of the group of packets. In another example, TDP policer 500 may delay processing and/or outputting the packet and/or group of packets. In yet another example, TDP policer 500 may process the packet and/or group of packets with a lower priority, with a lower bandwidth, and/or associated with a lower relative QoS.

As yet further shown in FIG. 6, if the packet size is not greater than the quantity of tokens (block 620—NO), the process 600 may include removing tokens, corresponding to the packet, from the policer (block 622). For example, TDP policer 500 may compare the packet size (e.g., p), associated with the packet and/or group of packets to the quantity of tokens stored in TDP policer 500 (e.g., BO). TDP policer 500 may determine, for example, that the packet size is not greater than the quantity of tokens stored in TDP policer 500 (e.g., p≦BO). Based on the determination that the packet size is not greater than the stored quantity of packets, TDP policer 500 may remove a quantity of tokens (e.g., at removal rate 425 of FIG. 4) from data rate policer 400 (FIG. 4) within TDP policer 500. TDP policer 500 may, based on the example above, remove 12 tokens from data rate policer 400 when processing the packet and/or group of packets associated with a packet size of 12 octets (e.g., 96 bits).

As further shown in FIG. 6, if a session time is greater than a session threshold (block 625—YES), then process 600 may include processing traffic as non-conforming traffic (block 655). For example, TDP policer 500 may determine a session time associated with the packet and/or group of packets. For example, TDP policer may determine the session time based on the time that the packet or group of packets was received (e.g., based on a timer and/or a marked time) and/or a current time. TDP policer 500 may compare the session time (e.g., ST) to a session threshold (e.g., M_ST) to determine that manner in which the traffic is to be processed. For example, TDP policer 500 may determine that the session time is greater than the session threshold (e.g., ST>M_ST) and may, in a manner similar to that described above (e.g., with respect to block 655) process the traffic as non-conforming traffic based on the determination that the session has expired.

As still further shown in FIG. 6, if a session time is not greater than a session threshold (block 625—NO), then process 600 may include determining an interval time associated with the traffic (block 630). For example, TDP policer 500 may determine a session time associated with the packet and/or group of packets. TDP policer 500 may compare the session time (e.g., ST) to a session threshold (e.g., M_ST) to determine a manner in which the traffic is to be processed. For example, TDP policer 500 may determine that the session time is not greater than the session threshold (e.g., ST≦M_ST) and may, based on the determination, identify an interval timer associated with the traffic.

TDP policer 500 may, for example, receive another packet and/or group of other packets associated with the traffic sent to or received from user device 115. TDP policer 500 may identify an interval time from the point in time that the packet and/or group of packets were received to another point when the other packet and/or other group of packets was received. TDP policer 500 may use the interval time to determine in which manner the traffic is to be processed.

As shown in FIG. 6, if an interval time is greater than an interval threshold (block 635—YES), then process 600 may include incrementing an interval violation counter (block 645). For example, TDP policer 500 may compare the interval time (e.g., IT) to an interval time threshold (e.g., M_IT) to determine whether an interval violation is associated with the traffic. TDP policer 500 may, for example, determine that the interval time is greater than interval threshold (e.g., IT>M_IT) and may determine that an interval violation has occurred with respect to the traffic. Based on the determination that the interval violation has occurred, TDP policer 500 may increment an interval violation counter in a manner that increases a quantity of interval violations (e.g., IV) by a particular quantity (e.g., IV=IV+1).

As also shown in FIG. 6, if a quantity of interval violations is greater than an interval violations threshold (block 650—YES), then process 600 may include processing the traffic as non-conforming traffic (block 655). For example, TDP policer 500 may compare the quantity of interval violations associated with the traffic to an interval violations threshold (e.g., M_IV) to determine the manner in which to process the traffic. TDP policer 500 may determine that the quantity of interval violations is greater than the quantity of interval violations threshold (e.g., IV>M_IV). Based on the determination that the quantity of interval violations is greater than the interval violations threshold, TDP policer 500 may process the traffic as non-conforming traffic in a manner similar to that described above (e.g., with respect to block 655).

As further shown in FIG. 6, if an interval time is not greater than an interval threshold (block 635—NO), or if a quantity of interval violations is not greater than an interval violations threshold (block 650—NO), then process 600 may include processing the traffic as conforming traffic (block 640). For example, TDP policer 500 may compare the interval time (e.g., IT) to an interval time threshold (e.g., M_IT) to determine whether an interval violation is associated with the traffic. TDP policer 500 may, for example, determine that the interval time is not greater than the interval threshold (e.g., IT≦M_IT) and may determine that an interval violation has not occurred with respect to the traffic. Based on the determination that the interval violation has not occurred, TDP policer 500 may process the traffic as conformation traffic.

Alternatively, TDP policer 500 may compare a quantity of interval violations associated with the traffic to an interval violations threshold (e.g., M_IV) to determine the manner in which to process the traffic. TDP policer 500 may determine that the quantity of interval violations is not greater than the quantity of interval violations threshold (e.g., IV≦M_IV). Based on the determination that the quantity of interval violations is not greater than the interval violations threshold, TDP policer 500 may process the traffic as conforming traffic.

When processing the traffic as conforming traffic, TDP policer 500 may forward the packet and/or group of packets associated with the traffic in a manner that conforms to the SLA. For example, if the traffic is to be forwarded with a particular forwarding priority (e.g., as specified by the SLA), then the packet and/or group of packets will be outputted and/or temporarily placed in a queue (e.g., associated with TDP policer 500) in a manner that corresponds with the forwarding priority. Additionally, or alternatively, if the traffic is to be outputted at a particular data rate and/or bandwidth, TDP policer 500 may output the packet and/or group of packets at the particular bandwidth and/or data rate and/or temporarily placed in a queue associated with the particular bandwidth and/or data rate allocated.

Systems and/or methods, described herein, may enable high bandwidth traffic and low bandwidth traffic to be processed using a TDP policer. The systems and/or methods may determine whether high bandwidth traffic, associated with a high bandwidth application, is conforming or non-conforming based on a data rate threshold specified in a service level agreement (SLA) and a data rate associated with the high bandwidth traffic.

In another example implementation, the systems and/or methods may determine whether low bandwidth traffic, associated with a low bandwidth application, is conforming or non-conforming based on a session time associated with the low bandwidth traffic and/or a session threshold specified in the SLA. In yet another example implementation, the systems and/or methods may determine whether low bandwidth traffic, associated with a low bandwidth application, is conforming or non-conforming based on an interval time associated with the low bandwidth traffic and/or an interval threshold specified in the SLA.

Based on a determination that the traffic is conforming (e.g., complies with bandwidth, session threshold, and/or interval threshold as specified by the SLA), the systems and/ or methods may process the traffic based on a priority associated with the traffic. If, however, the systems and/or methods determine that the traffic is non-conforming (e.g., does not comply with the bandwidth threshold, the session threshold, and/or the interval threshold as specified by the SLA), then the systems and/or methods may drop packets associated with the traffic or may delay and/or reduce a priority associated with the traffic.

The foregoing description provides illustration and description, but is not intended to be exhaustive or to limit the implementations to the precise form disclosed. Modifications and variations are possible in light of the above teachings or may be acquired from practice of the embodiments.

While a series of blocks has been described with regard to FIG. 6, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The term "packet" as used herein, may refer to a datagram, a data item, or a cell; a fragment of a packet, a fragment of a datagram, a fragment of a data item, a fragment of a cell; or another type, arrangement, or packaging of data.

What is claimed is:

1. A method performed by a policing device, the method comprising:
   receiving, by the policing device, a packet associated with traffic destined for a destination device;
   determining, by the policing device, whether a quantity of tokens, corresponding to a length of the packet, is greater than a quantity of tokens stored by the policing device;

determining, by the policing device, whether a session time, associated with a communication session between a source device and the destination device, is greater than a session threshold, where the session time is based on an elapsed time from when a first packet, associated with the traffic, was received;

processing, by the policing device, the traffic, as conforming traffic, when the session time is not greater than the session threshold, where processing the conforming traffic includes outputting the packet to the destination device; and processing, by the policing device, the traffic as non-conforming traffic, when the session time is greater than the session threshold, where processing the non-conforming traffic includes dropping or delaying the packet.

2. The method of claim 1, where processing the traffic, as conforming traffic, further includes:

identifying a packet time interval from a previous time that another packet, associated with the traffic, was received to a time when the packet was received; and determining that an interval violation has occurred when the packet time interval is greater than an interval threshold associated with the traffic.

3. The method of claim 2, further comprising:

identifying a quantity of interval violations associated with the traffic based on the interval violation and at least one other interval violation from a prior point in time; and determine that the traffic is conforming traffic when the quantity of interval violations is not greater than a violation threshold.

4. The method of claim 2, where the packet time interval is associated with period of inactivity where no packets, associated with the traffic, are received; and where the packet time interval threshold corresponds to a maximum period of inactivity permitted with respect to the traffic.

5. The method of claim 1, further including:

setting the rate at which the tokens are to be generated based on an expected bandwidth or data rate associated with the traffic.

6. The method of claim 1, further including:

setting the session threshold based on a service level agreement associated with the traffic destined for the destination device, where setting the session threshold occurs at a prior point in time before receiving the packet, associated with traffic destined for the destination device.

7. The method of claim 1, further comprising:

determining that another quantity of tokens, associated with a length of another packet, is not greater than another quantity of tokens generated by the policing device; and dropping or delaying the other packet based on the determination that the other quantity of units is not greater than the other quantity of tokens generated by the policing device.

8. A policing device comprising:

a data rate policing unit that generates tokens used to police traffic associated with a user device, where each token corresponds to a quantity of bits of data to be processed, and where the data rate policing unit is to:

receive a packet corresponding to the traffic associated with the user device, identify a quantity of tokens to be used to process the packet based on the quantity of bits of data to be processed and a plurality of bits associated with the packet, and output the packet based on the determination that the identified quantity of tokens is not greater than the quantity of tokens generated by the data rate policing unit;

a time-based policing unit to:

receive the packet from the data rate policing unit, identify an interval time associated with the packet based on a time when a previous packet, associated with the traffic, was received and the current time, and output the packet and the interval time; and a policing analyzer unit to:

receive, from the time-based policing unit, the packet and the interval time, identify a violation when the interval time is greater than an interval threshold, output the packet according to a first forwarding priority based on a determination that a quantity of violations is not greater than a violation threshold, where the quantity of violations is base on the identified violation and one or more prior violations associated with the traffic flow, and output the packet according to a second forwarding priority based on a determination that the quantity of violations is greater than the violation threshold, where the second forwarding prior is a lower priority than the first forwarding priority.

9. The policing device of claim 8, where the time-based unit is further to:

determine that a session time associated with the packet is less than a session threshold, where the session time is based on a current time and a prior time when a first packet, associated with the traffic flow, was received.

10. The policing device of claim 9, where the time-based unit is further to:

determine that a session time associated with another packet associated with another traffic flow is greater than another session threshold associated with the other traffic flow, and drop or delay the other packet based on the determination that session time associated with the other packet is greater than the other session threshold.

11. The policing device of claim 8, where the data rate policing unit is based on a logical token bucket, and where the token bucket:

stores the generated tokens used to police the traffic associated with a user device, and removes one or more tokens based on a quantity of bits associated with received traffic.

12. The policing device of claim 11, where, when storing the generated tokens, the data rate policing unit is further to:

determine that a quantity of tokens stored in the token bucket has reached a capacity of the token bucket, and set the quantity of tokens equal to the capacity of the token bucket.

13. The policing device of claim 11, where a maximum quantity of tokens that are available to be used to process packets associated with the traffic over a period of time is based on a maximum capacity of the token bucket and a product of a rate at which tokens are generated multiplied by the period of time.

14. The policing device of claim 8, where the data rate policing unit is further to:

determine that another quantity of tokens, to be used to process another packet, is greater than a particular quantity of tokens generated by the data rate policing unit, and drop the other packet based on the determination that the other quantity of tokens is greater than the particular quantity of tokens.

15. The policing device of claim 8, where the policing analyzer is further to:
receive another packet associated with the traffic flow and another interval time,
determine that another violation has not occurred when the other interval time is not greater than the interval threshold, and
output the other packet according to the first forwarding priority based on the determination that the other violation has not occurred.

16. The policing device of claim 8, where, before receiving the packet corresponding to the traffic, the data rate policing unit is further to:
initialize a rate at which tokens are to be generated based on an expected data rate or bandwidth associated with the traffic; and
the policing analyzer is further to:
initialize the interval threshold based on a maximum duration of inactivity as specified by a network administrator associated with the policing device or terms of a service level agreement associated with the user device.

17. A non-transitory computer-readable medium comprising:
instructions for receiving a message associated with a session with a user device;
instructions for determining that a first quantity of tokens, to be used to process the message, is less than a second quantity of tokens stored in a memory;
instructions for determining that a duration of the session is less than a session threshold when the first quantity of tokens is less than the second quantity of tokens stored in a memory;
instructions for identifying that an interval violation has occurred based on a determination that a message interval, associated with the message, is greater than an interval threshold and when the duration of the session is less than the session threshold,
where the message interval is from a prior time when another message, associated with the session, was received to a time that the message was received, and
where the determining includes incrementing a quantity of interval violations associated with the session;
instructions for outputting the message when the quantity of interval violations is not greater than an interval violation threshold; and
instructions for dropping or delaying the message when the quantity of interval violations is greater than the interval violation threshold.

18. The non-transitory computer-readable medium of claim 17, where determining that the first quantity of tokens is less than the second quantity of tokens further includes:
determining the first quantity of tokens to be used to process the message by dividing a plurality of bits, associated with a length of the message, by a quantity of bits to which each of the first quantity of tokens corresponds; and
compare the first quantity of tokens to be used to process the message with the second quantity of tokens stored in the memory.

19. The non-transitory computer-readable medium of claim 17, further comprising:
determining that a third quantity of tokens, to be used to process a further message, is not less than a fourth quantity of tokens stored in the memory; and
drop the further message based on the determination that the third quantity of tokens is not less than the fourth quantity of tokens stored in the memory.

20. The non-transitory computer readable medium of claim 17, where determining that the duration of the session is less than the session threshold includes:
determining the duration of the session from a previous time when a first message, associated with the session, was received to a current time.

21. The non-transitory computer readable medium of claim 17, further comprising:
determining that a duration of another session, with which a further message is associated, is greater than a session threshold associated with the other session; and
dropping the further message based on the determination that the duration of the other session is greater than the session threshold associated with the other session.

22. The non-transitory computer readable medium of claim 17, further comprising:
determining that an interval violation has not occurred when another message interval, associated with a further message, is not greater than another interval threshold; and
outputting the further message based on the determination that the interval violation has not occurred.

23. The non-transitory computer readable medium of claim 17, where the quantity of tokens stored in the memory is based on a rate at which the tokens are generated or discarded when processing messages associated with the session,
where the rate at which the tokens are generated corresponds to an expected data rate or bandwidth of the messages associated with the session, and
where the rate at which the tokens are discarded is based on an actual data rate or bandwidth of the messages being processed.

24. The non-transitory computer readable medium of claim 17, where the interval violation threshold corresponds to a maximum quantity of interval violations that are permitted before messages, associated with the session with the user device, will be processed as non-conforming messages, and
where processing the non-conforming messages includes at least one of dropping, delaying, or reducing a forwarding priority associated with the messages that do not comply with terms of a service level agreement associated with the user device.

* * * * *